T. A. PACETTY.
SPLITTING ATTACHMENT FOR ICE SAWS.
APPLICATION FILED FEB. 8, 1915.

1,154,541.

Patented Sept. 21, 1915.

Witnesses
J. Ralph Hoge

Inventor
T. A. Pacetty
By H. B. Willson & Co
Attorneys

UNITED STATES PATENT OFFICE.

THOMAS A. PACETTY, OF COLUMBUS, GEORGIA.

SPLITTING ATTACHMENT FOR ICE-SAWS.

1,154,541.  Specification of Letters Patent.  Patented Sept. 21, 1915.

Application filed February 8, 1915. Serial No. 6,853.

*To all whom it may concern:*

Be it known that I, THOMAS A. PACETTY, a citizen of the United States, residing at Columbus, in the county of Muscogee and State of Georgia, have invented certain new and useful Improvements in Splitting Attachments for Ice-Saws; and I do declare the following to be a full, clear, and exact description of the invention, such as will enable others skilled in the art to which it appertains to make and use the same.

This invention relates to improvements in ice splitting attachments for ice saws.

The object of the invention is to provide a simply constructed and efficient device for adjustable connection to an ice saw and which is designed to be inserted in a crevice in the ice formed by the saw for splitting the ice in a perfectly smooth and accurate manner and by the use of which much time may be saved in cutting up ice for city delivery.

Another object is to provide a device of this character which may be readily applied to saws already in use.

With these and other objects in view, the invention consists of certain novel features of construction, and the combination and arrangement of parts as will be more fully described and claimed.

Figure 1:
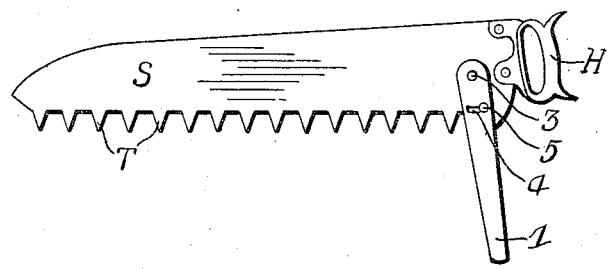
Figure 2:
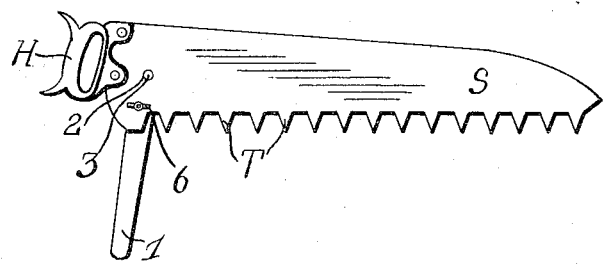
Figure 3:
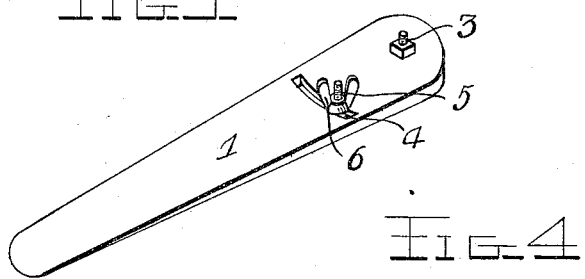
Figure 4:
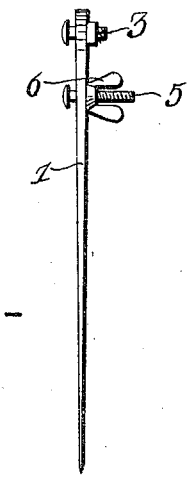

In the accompanying drawings, Figure 1 represents a side elevation of an ordinary ice saw equipped with this attachment; Fig. 2 represents a similar view taken from the other side of the saw; Fig. 3 is a detail perspective view of the attachment detached; Fig. 4 is an edge view thereof.

In the embodiment illustrated, an ice saw S of ordinary construction is shown provided with the usual teeth T and handle H, the latter being positioned in the usual manner at one end of the saw blade.

The device comprising this invention constitutes a wedge-shaped splitting blade 1 constructed of steel or other suitable material and which tapers to a cutting edge at one end, the opposite end thereof being provided with an aperture 2 through which a securing bolt 3 is designed to pass for connecting the device to the saw S at the rear end thereof adjacent the handle, the cutting end of said blade 1 extending downwardly from the cutting edge of the saw as shown. An arcuate slot 4 extends transversely of the cutting blade 1 at a point spaced inwardly from the aperture 3 and is designed to engage a bolt 5 which extends laterally from the saw blade at a point below the bolt 3, said bolt 5 being provided with a winged nut 6 for adjustably connecting the blade 1 to the saw blade at any desired angle.

In the use of this device, the saw is first employed for cutting a groove in the ice to be split and when said groove or crevice has been formed a depth corresponding to the width of the saw, said saw is withdrawn and this splitting blade 1 inserted in the crevice formed thereby, and pressure may be exerted on said blade in any suitable manner by dropping it together with the saw thereby causing the cutting point or end thereof to forcibly engage the ice which will cause the ice to split in two parts in a perfectly smooth accurate manner, and in alinement with the groove first formed by the saw. From the above it will be obvious that the weight of the saw when dropped causes the forcible insertion of the blade 1 and thus applies sufficient pressure to enable it to split the ice.

From the above it will be obvious that the use of this device will save much time when cutting up large blocks of ice for city delivery as it is only necessary to first start the ice by forming a groove the depth of the saw therein and then completing the separation thereof by inserting the wedge-shaped splitting blade.

This device may be applied to any ordinary ice cutting saw by drilling two small holes one above the other at the rear end of the saw, said holes being preferably about one-fourth of an inch in diameter and one and one-half inches from each other measuring from center to center. By loosening the thumb nut 7, it will be obvious that this blade may be disposed at any desired angle relatively to the saw blade and when properly positioned it may be secured rigidly thereto by tightening up the thumb nut.

I claim as my invention:

An ice splitting attachment for saws comprising a wedge-shaped cutting blade having an aperture at the thick end thereof, and an arcuate slot extending transversely of said end at points spaced inwardly from said aperture, and means for connecting said blade to a saw.

In testimony whereof I have hereunto set my hand in presence of two subscribing witnesses.

THOMAS A. PACETTY.

Witnesses:
R. G. THORNTON,
CHAS. J. EIFLER.

Copies of this patent may be obtained for five cents each, by addressing the "Commissioner of Patents, Washington, D. C."